United States Patent
Bodin et al.

(10) Patent No.: US 7,172,238 B2
(45) Date of Patent: Feb. 6, 2007

(54) VEHICLE DOOR AND A METHOD TO MAKE SUCH A DOOR

(75) Inventors: Hans Bodin, Sunderbyn (SE); Martin Jonsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 183 days.

(21) Appl. No.: 10/636,397

(22) Filed: Aug. 7, 2003

(65) Prior Publication Data

US 2004/0026957 A1  Feb. 12, 2004

Related U.S. Application Data

(63) Continuation-in-part of application No. PCT/SE02/00219, filed on Feb. 8, 2002.

(30) Foreign Application Priority Data

Feb. 9, 2001  (SE)  .................................... 0100409

(51) Int. Cl.
*B60J 5/04*  (2006.01)

(52) U.S. Cl. ................ 296/146.6; 296/146.5; 296/146.1; 296/187.03; 296/187.12

(58) Field of Classification Search ............. 296/146.1, 296/146.5, 146.6, 146.7, 146.9, 187.03, 187.12; 49/502

See application file for complete search history.

(56) References Cited

U.S. PATENT DOCUMENTS

| | | | | |
|---|---|---|---|---|
| 3,782,036 A | * | 1/1974 | Clark et al. .................... | 49/502 |
| 4,702,040 A | * | 10/1987 | Hellriegel ..................... | 49/502 |
| 4,827,671 A | * | 5/1989 | Herringshaw et al. ......... | 49/503 |
| 4,845,894 A | * | 7/1989 | Herringshaw et al. ........ | 49/502 |
| 5,040,334 A | * | 8/1991 | Dossin et al. ................. | 49/502 |
| 5,398,453 A | * | 3/1995 | Heim et al. .................... | 49/502 |
| 5,581,947 A | * | 12/1996 | Kowall et al. ................. | 49/451 |
| 5,908,216 A | * | 6/1999 | Townsend ................ | 296/146.6 |
| 6,135,537 A | * | 10/2000 | Giddons ................... | 296/146.6 |
| 6,196,619 B1 | * | 3/2001 | Townsend et al. ........ | 296/146.6 |
| 6,231,112 B1 | * | 5/2001 | Fukumoto et al. ........ | 296/146.5 |
| 6,283,534 B1 | * | 9/2001 | Mrozowski et al. ..... | 296/146.2 |
| 6,302,473 B1 | * | 10/2001 | Weber ...................... | 296/146.6 |
| 6,305,738 B1 | * | 10/2001 | Gehringhoff et al. .... | 296/146.6 |
| 2002/0073625 A1 | * | 6/2002 | Jennings ....................... | 49/502 |
| 2002/0073627 A1 | * | 6/2002 | Hock ........................... | 49/502 |
| 2004/0195860 A1 | * | 10/2004 | Koellner et al. ......... | 296/146.5 |

FOREIGN PATENT DOCUMENTS

| | | | | |
|---|---|---|---|---|
| DE | 19930001 | | 1/2001 | |
| JP | 405178092 A | * | 7/1993 | ............... 296/146.5 |

* cited by examiner

*Primary Examiner*—Dennis H. Pedder
*Assistant Examiner*—Greg Blankenship
(74) *Attorney, Agent, or Firm*—Mark P. Stone

(57) ABSTRACT

A vehicle door has a supportive frame (10). A waist rail (14) and a side impact guard beam (22) are formed integrally with the supportive frame. The entire frame is made of high strength sheet steel. The door is produced by hot stamping a steel sheet blank into the shape of a supportive door frame that includes an integral waist rail (14) and a side impact guard beam (22), and hardening the shaped door frame while the frame remains in the shaping tools, and fastening an outer panel (31) to the finished door such that the side collision guard beam (22) of the frame will lie close to the outer panel (31).

13 Claims, 4 Drawing Sheets

VEHICLE DOOR AND A METHOD TO MAKE SUCH A DOOR

This application is a continuation-in-part of International Application PCT/SE02/00219, having an international filing date of Feb. 8, 2002, published in English under PCT Article 21(2).

FIELD OF INVENTION

The present invention relates to a vehicle door which comprises a supportive door frame that includes a waist rail and a side impact guard, and which further comprises an outer panel and inner trim material fastened to the frame, wherein the side impact guard is positioned close to the outer panel. The invention also relates to a method of manufacturing a vehicle door.

TECHNICAL BACKGROUND OF THE INVENTION AND A BRIEF DESCRIPTION OF KNOWN TECHNOLOGY

Modern vehicle doors normally comprise a supportive deep-drawn so-called inner panel which has the thickness of the entire door. An outer panel is folded around the edges of the inner panel and fastened with glue. The inner panel is deep-drawn and cannot therefore be produced from high-strength steel. A so-called waist rail beneath the window is welded to the inner panel and can be placed either inwardly of or outwardly of the window. A side impact guard beam made of steel that has a considerably higher mechanical strength than the steel from which the inner panel is made is also welded to the inner panel and placed nearest the outer panel. A relatively flat trim is fastened to the inner panel. The inner door components, such as locks, window guides and window elevators, are mounted within the deep inner panel, i.e. on the outside of said panel.

THE OBJECT OF THE INVENTION AND A SUMMARY OF THE INVENTION

An object of the present invention is to provide a lightweight, strong vehicle door which can be produced cheaply and with which door components, such as locks, window guides and window elevators, can be readily fitted and easily accessed. In principle, this object is achieved with a vehicle door in which the waist rail and the side impact guard are both produced integrally with the supporting door frame. The door frame is suitably manufactured by hot stamping a sheet steel blank to form a supportive door frame that has a waist rail and a side impact guard beam integral therewith, and then hardening the shaped door frame with the frame remaining in the mould tools. The forming is facilitated by the fact that the door frame can be made thin in relation to the full thickness of the door, therewith enabling a door frame of high strength steel to be produced. In the case of a typically constructed door that has a deeper configuration, it is necessary to use steel that has a lower strength.

Manufacture of the door is completed by attaching an outer panel to the supportive door frame, such that the side impact guard beam included in the frame will be situated close to the outer panel.

A door frame that has a very high mechanical strength can be produced in this way, and the major part of the thickness of the door may be situated on the inside of the door frame instead of on the outside of the supportive part. This facilitates shaping and enables door components relating to locks and window elevators to be fitted to the frame while still being easily accessed between the frame and the readily removed trim. The invention is defined in the accompanying Claims.

BRIEF DESCRIPTION OF THE DRAWINGS

The computer drawn figures illustrate the supportive parts of a vehicle door by way of an example of the invention.

DETAILED DESCRIPTION OF THE ILLUSTRATED EMBODIMENTS

Figure 1:
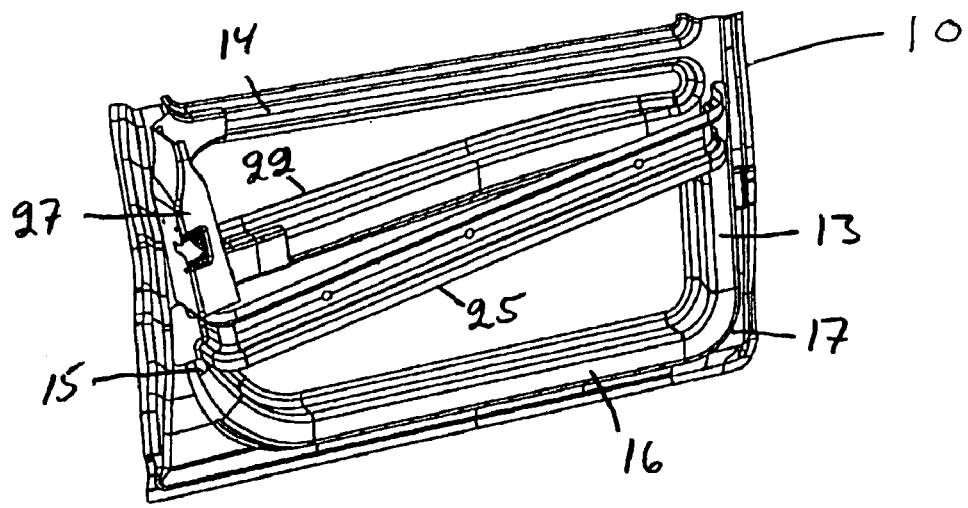
FIG. 1 is a perspective view of the supportive frame of the vehicle door, as seen from the vehicle interior.
Figure 2:
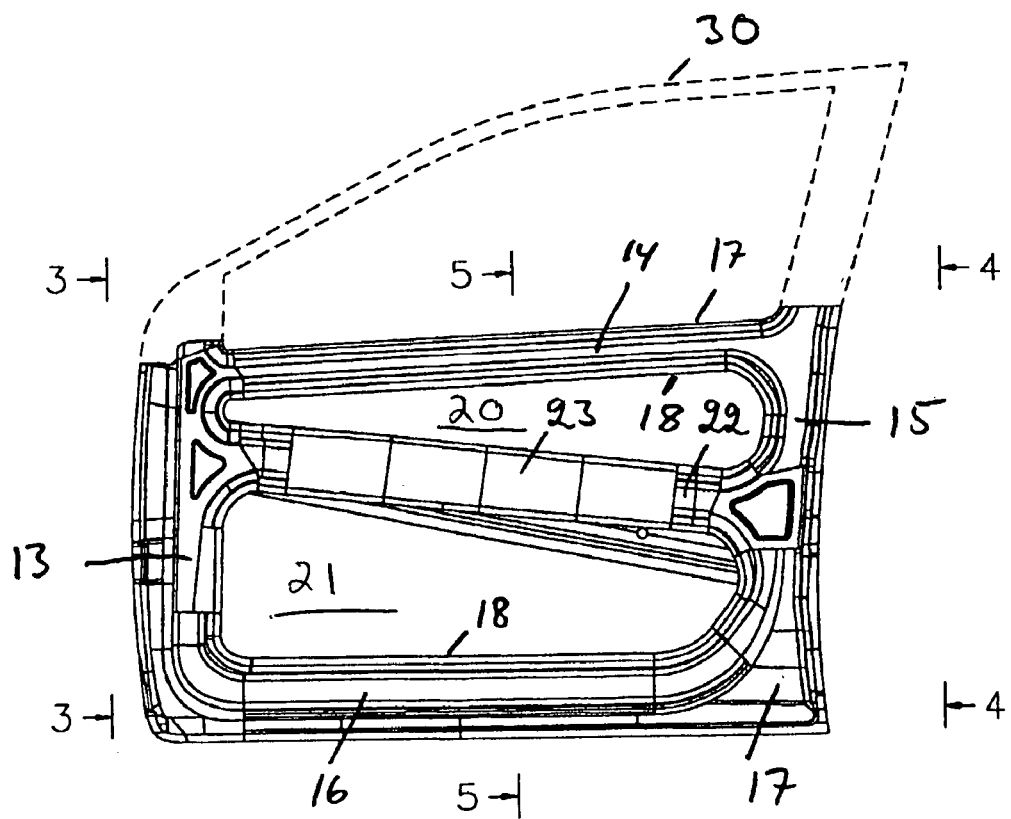
FIG. 2 is a side view of the frame as seen externally.
Figure 5:
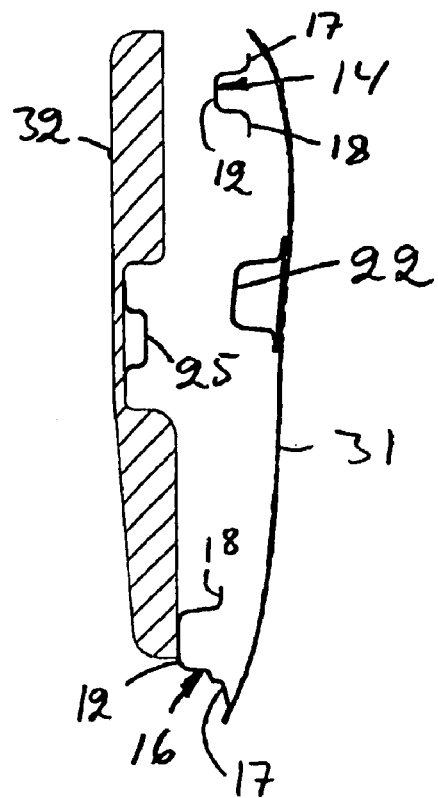
FIG. 5 is a sectioned view taken on the line 5—5 in FIG. 1.
Figure 6:
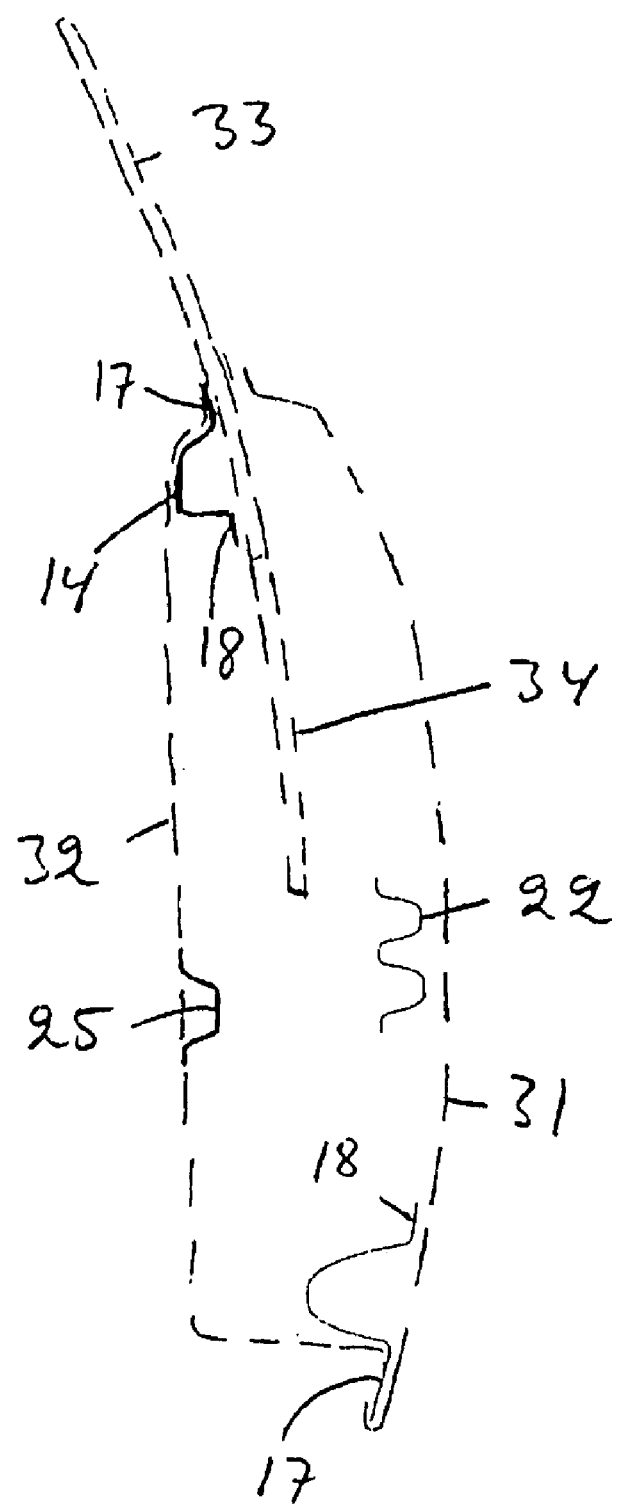
FIG. 6 is a sectioned view of an alternative embodiment of the door frame.

Shown in FIG. 1 is a frame 10 belonging to the left-hand door of a vehicle, said frame being seen from inside the vehicle interior. FIG. 2 is an external view of the same frame. The frame is hot stamped from a flat steel sheet to obtain a ring-shaped hat-beam 13–16 that includes a crown 12 and side flanges 17, 18 of varying widths. The cross-section of the hat beam is shown in FIG. 5. The crown or hump of the beam faces in towards the vehicle interior. The hat beam includes four straight parts 13, 14, 15, 16 which are joined together with the aid of bends. A hole 20, 21 is formed in the centre of the ring-shaped hat beam, and a side impact guard beam 22 extends between the beam parts 13 and 15 and bridges the hole 20, 21. The beam 22 may also have a hat profile with the crown of the hat facing inwards as shown, and may also include a spot-welded cover 23. Alternatively, it may have a different cross-sectional shape, for instance the shape of a double-hat profile and may be positioned with its open side facing inwardly towards the vehicle interior as shown in FIG. 6. The hat beam 11 may also have another cross-section profile and may have different profiles at different locations and, for instance, have the form of a double hat at given locations. The door frame 10 is provided on its side that faces towards the vehicle interior with an attachment bracket 25, which may be secured with spot welds. The attachment bracket 25 may also conveniently have a hat profile, therewith adding to the strength of the door frame.

Figure 3:
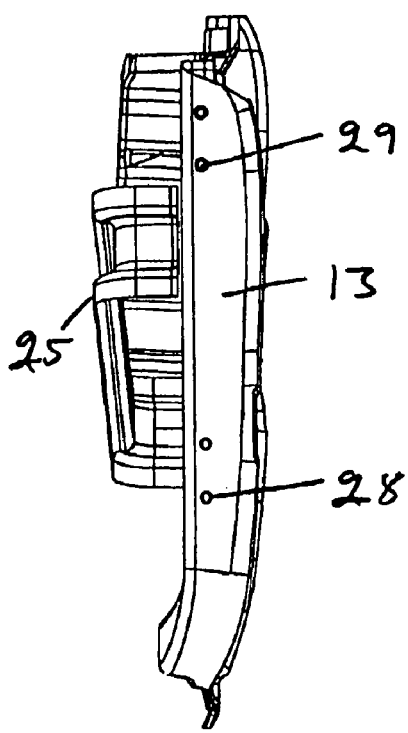
FIGS. 3 and 4 are views seen in the direction of respective arrows 3 and 4 in FIG. 2.
Figure 4:
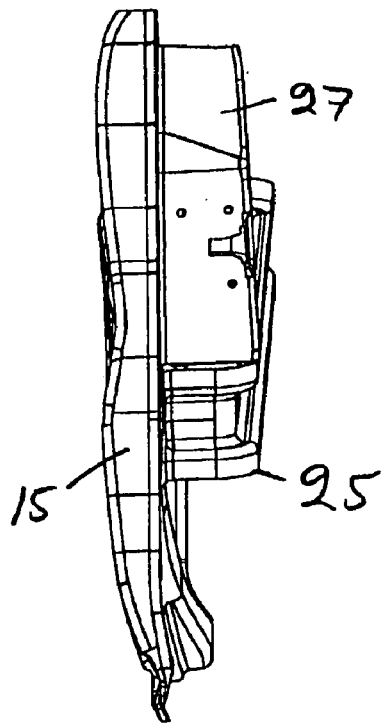

A box 27 accommodating the door lock is spot welded to the door frame. FIG. 3 shows hinge fastening holes 28, 29. As will be seen from FIG. 2, a window arch 30 is attached to the door frame 10, wherein window guides (not shown) can extend down in the interspace between the guard beam 22 and the attachment bracket 23.

FIG. 5 shows the outer door panel 31 and interior trim 32. The trim is comprised of hard plastic foam that includes an outer layer of plastic, fabric, leather or some other suitable material. It is attached to the hat beam 13, 15, 16 of the door frame and to the attachment bracket 25. Its upper edge is sealed off with a strip against the window pane. The outer panel 31 is folded around the outer side flange 17 of the hat beam, as shown, and secured with glue and sealed with a rubber strip against the window pane. The outer panel 31 lies close to the frame 10 and the side impact guard beam 22 of said frame, and all interior door components are positioned between the frame 10 and the interior trim and fastened to the frame or to said attachment bracket 25, therewith enabling said components to be easily reached after having removed the interior trim. As illustrated in the drawing, the side impact guard beam 22 is directly adjacent to the outer panel 31, and no intermediate structural components are disposed therebetween. The upper beam 14 of the frame 10 forms a so-called waist rail, i.e. a beam fitted beneath the window, this beam now being integrated in the frame instead of being welded separately thereto as in the case of conventional vehicle doors. Many conventional vehicle doors also include a separate lower reinforcement beam, this lower beam being replaced by the lower frame beam 16 in the illustrated case.

FIG. 6 is a sectioned view of an alternative embodiment of the frame 10, where the upper beam 14, the waist rail, has been extended in on the inside of the window, in the bends towards the beams 13, 15. The A-pillar and B-pillar of the vehicle are often placed inwardly in relation to the outside of the door, wherein the inwardly positioned waist rail shown in FIG. 6 can be positioned to overlap said pillars at least to some extent, so that the beam, or rail, will be clamped axially between the A-pillar and B-pillar in the event of a frontal collision, and therewith transfer force from the A-pillar to the B-pillar. An outer panel 31, interior trim 32, window 33 and window guides 34 are also shown in the figure. The illustrated side collision guard beam 22 has a double-hat profile which is open towards the vehicle interior.

Method of Manufacture

The door frame 10 is produced from a flat metal blank which is heated to its austenitic temperature and passed, whilst hot, into a hot stamping press and shaped in one stroke of the press to the shape desired in the space of one second. The shaped blank is then left between the tools or dies and there cooled until hardened. Because the shaped blank, i.e. the door frame 10, is allowed to harden in the fixture in this way, it is unable to warp or buckle during the hardening process.

When using a boron steel, i.e. a simple carbon-manganese steel alloyed with boron, there can be achieved a yield strength of 1100 N/mm$^2$ and a tensile strength of 1500 N/mm$^2$ or greater, wherewith the entire door frame, including the reinforcement beam, will have the same strength. One significant advantage afforded by this method of manufacture is that a steel having a strain capacity in excess of 7% before rupture can be obtained. The depth of the illustrated door frame is not greater than the height of the crown on the hat beam, and the material thickness may, for instance, be 1.0–1.5 mm, with the entire frame having the same material thickness. There can also be used a so-called tailor blank, i.e. a blank which is laser-welded together from steel sheets of different thicknesses or analyses. The attachment holes 28, 29 in the frame 10 can be made in the blank prior to shaping the same, i.e. prior to hardening. Alternatively, the holes can be cut with the aid of lasers or punched in the finished, hardened frame. However, because the hinges and other components may be welded in place in accordance with an alternative method, the holes may be omitted when this alternative is used.

Because the door frame 10 may be made thin, shaping of the blank can be effected more readily, therewith enabling the door frame to be produced by cold-shaping high strength steel sheet as an alternative. However, it is not possible to use in this alternative method steel sheet that has the same high yield strength as that reached in the aforedescribed hot stamping method, with which yield strengths of at least 1000 N/mm$^2$ are attained. However, there can be used high strength steel sheet that has a yield strength of at least 350 N/mm$^2$ and an tensile strength of at least 600 N/mm$^2$. An ultra-high strength steel having a yield point of 500 N/mm$^2$ and a tensile strength of 800 N/mm$^2$ can probably be used. The rupture strain, however, will be less when cold forming than when applying the described hot stamp method.

Figure 7:
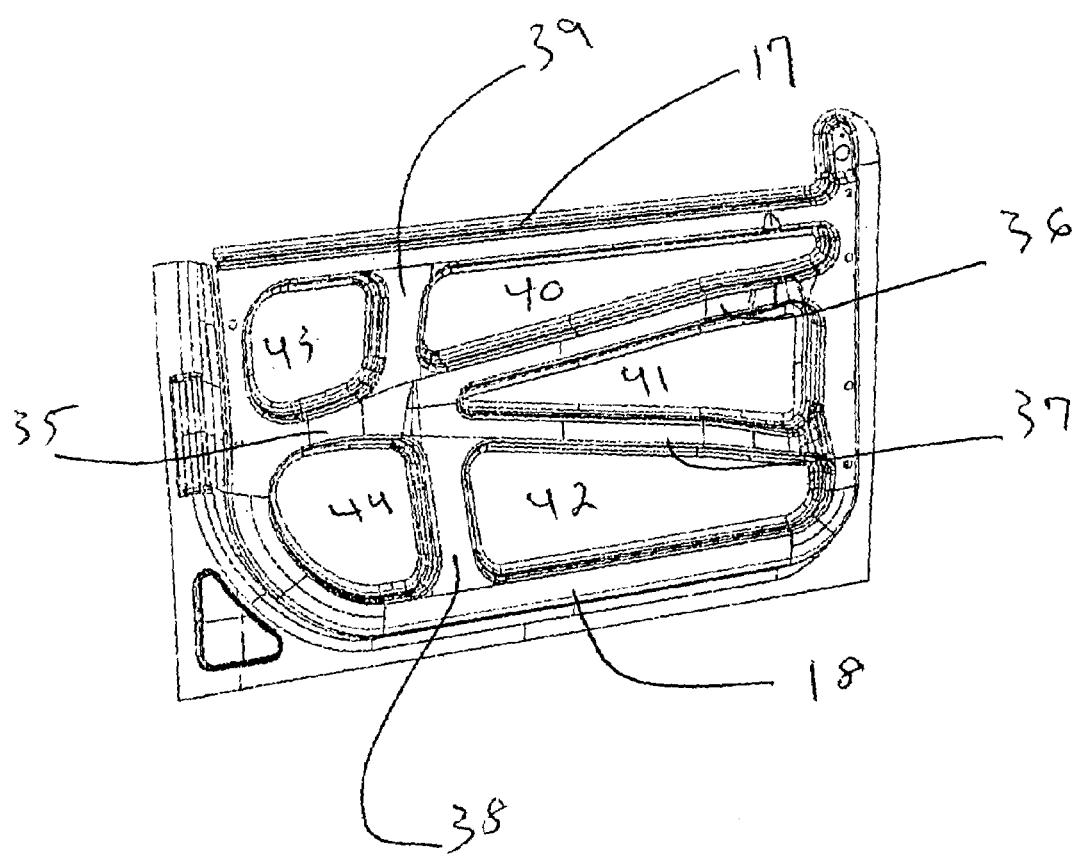
FIG. 7 is a perspective view of a further alternative embodiment of a supportive door frame, as seen from the vehicle interior.

FIG. 7 illustrates a further embodiment of a supportive door frame for a vehicle, in accordance with the present invention. A guard beam is generally designated by reference numeral 35. The guard beam 35 diverges into two separate beam sections 36, 37 in a direction from the left side of the door frame to the right side of the door frame, as shown in FIG. 7. Vertical supporting elements, designated by reference numerals 38 and 39, extend in a substantially perpendicular orientation from the guard beam 35, proximate to the location at which the guard beam diverges into the two separate beam sections 36 and 37. Vertical support element 38 extends from the guard beam 35 to the lower side flange 18 of the vehicle door, while vertical supporting element 39 extends from the guard beam 35 to the upper side flange 17 of the vehicle door. The guard beam 35, the guard beam sections 36 and 37, and the vertical supporting elements 38 and 39, define therebetween openings 40, 41, 42, 43 and 44, as illustrated by FIG. 7. The embodiment illustrated by FIG. 7 provides enhanced support because the guard element is not limited to a single guard beam, but includes both vertical supporting elements 38 and 39, and guard beam sections 36 and 37.

Although FIG. 7 illustrates that the guard beam 35 diverges into two separate beam sections 36, 37, it is also within the scope of the present invention to provide a unitary guard beam 35, which does not diverge into separate guard beam sections, extending laterally between the two opposed sides of the door frame. Vertical supporting elements, similar to those designated by reference numerals 38 and 39 in FIG. 7, can extend downwardly and upwardly, respectively, from the single guard beam in a substantially perpendicular orientation relative to the single guard beam.

Preferably, in the embodiments disclosed herein, the guard element is close to the outer door panel but does not directly contact the outer door panel to avoid causing dents on the painted outer panel. Therefore, as discussed herein, the vehicle door in accordance with the present invention is arranged such that the side impact guard is positioned close to the outer panel of the vehicle door. Preferably, the distance of separation between the side impact guard and the outer door panel will be in the range of approximately between 2 mm. through 1 cm.

The invention claimed is:

1. A vehicle door comprising a steel supportive door frame (10) that includes a waist rail (14) and a side impact guard (22), and further comprising an outer panel (31) and interior trim (32) fastened to the frame, wherein the side impact guard is positioned directly adjacent the outer panel with no intermediate structural components disposed therebetween, characterised in that the waist rail (14) and the side impact guard (22) are both formed integrally with the door frame (10), in that the steel of the door frame has a yield strength of at least 350 N/mm$^2$, and in that the door frame (10) has the form of ring-shaped hat beam (13, 16) having inner and outer side flanges (17, 18) of varying widths, the crown of the hat beam facing towards the vehicle interior, wherein the side impact guard (22) bridges a hole (20, 21) formed between the inner side flanges (18) of the ring-shaped hat beam, an edge of said outer panel (31) being fastened to an edge of the outer side flange.

2. The vehicle door as claimed in claim 1, characterised in that the door frame (10) is formed from hot stamped and hardened steel sheet.

3. The vehicle door according to claim 1, characterised in that said side impact guard (22) is a beam.

4. The vehicle door according to claim 3, characterised in that said side impact guard (35) includes at least one supporting element (38, 39) extending from one side of said beam.

5. A vehicle door comprising a steel supportive door frame (10) that includes a waist rail (14) and a side impact guard (22), and further comprising an outer panel (31) and interior trim (32) fastened to the frame, wherein the side impact guard is positioned directly adjacent the outer panel with no intermediate structural components disposed therebetween, characterised in that the waist rail (14) and the side impact guard (22) are both formed integrally with the door frame (10), and in that the steel of the door frame has a yield strength of at least 900 N/mm$^2$; and in that the door frame (10) has the form of ring-shaped hat beam (13, 16) having inner and outer side flanges (17, 18) of varying widths, the crown of the hat beam facing towards the vehicle interior, wherein the side impact guard (22) bridges a hole (20, 21) formed between the inner side flanges (18) of the ring-shaped hat beam, an edge of said outer panel (31) being fastened to an edge of the outer side flange.

6. The vehicle door as claimed in claim 5, characterised in that said steel has a strain capacity of at least 7% before rupture.

7. A vehicle door comprising a steel supportive door frame (10) that includes a waist rail (14) and a side impact guard (22), and further comprising an outer panel (31) and interior trim (32) fastened to the frame, wherein the side impact guard is positioned close to the outer panel, characterised in that the waist rail (14) and the side impact guard (22) are both formed integrally with the door frame (10), in that the steel of the door frame has a yield strength of at least 350 N/mm$^2$, and in that the door frame (10) has the form of ring-shaped hat beam (13, 16) having side flanges (17, 18) of varying widths, wherein the side impact guard (22) bridges a hole (20, 21) formed between the inner side flanges (18) of the ring-shaped hat beam; the crown (12) of the hat beam (13, 16) facing towards the vehicle interior; and an attachment bracket for attachment of the interior trim (32) is fastened to the hat beam (11) and bridges the hole (20, 21) formed between the inner side flanges (18) of the ring-shaped hat beam, wherein space for a window is formed between the attachment bracket and the side impact guard (22).

8. A vehicle door comprising a steel supportive door frame (10) that includes a waist rail (14) and a side impact guard (22), and further comprising an outer panel (31) and interior trim (32) fastened to the frame, wherein the side impact guard is positioned close to the outer panel, characterised in that the waist rail (14) and the side impact guard (22) are both formed integrally with the door frame (10), and in that the steel of the door frame has a yield strength of at least 350 N/mm$^2$; in that said side impact guard (22) is a beam; and in that said side impact guard (35) includes said at least one supporting element (38, 39) extending from two opposed sides of said beam, wherein said beam and said supporting elements are generally configured, at least in part, in the form of a cross.

9. A vehicle door comprising a steel supportive door frame (10) that includes a waist rail (14) and a side impact guard (22), and further comprising an outer panel (31) and interior trim (32) fastened to the frame, wherein the side impact guard is positioned close to the outer panel, characterised in that the waist rail (14) and the side impact guard (22) are both formed integrally with the door frame (10), and in that the steel of the door frame has a yield strength of at least 350 N/mm$^2$; in that said side impact guard (22) is a beam; in that said side impact guard (35) includes at least one supporting element (38, 39) extending from one side of said beam; and in that said side impact guard (35) and said at least one supporting element (38, 39) are oriented substantially perpendicular relative to each other.

10. A vehicle door comprising a steel supportive door frame (10) that includes a waist rail (14) and a side impact guard (22), and further comprising an outer panel (31) and interior trim (32) fastened to the frame, said frame having the form of a hat beam with inner and outer side flanges, the crown of the hat beam facing towards the vehicle interior, wherein the side impact guard is positioned directly adjacent the outer panel with no intermediate structural components disposed therebetween, characterised in that the waist rail (14) and the side impact guard (22) are both formed integrally with the door frame (10), and in that the steel of the door frame has a yield strength of at least 350 N/mm$^2$; in that said side impact guard (22) is a beam; and in that said beam comprises a main body (35) which diverges into two separate beam sections (36, 37), an edge of said outer panel (31) being fastened to an edge of the outer side flange.

11. The vehicle door according to claim 10, characterised in that said side impact guard includes at least one supporting element extending from said beam.

12. A vehicle door comprising:
a supportive ring-shaped steel frame carrying an outer panel and an interior trim,
said steel frame comprising a waist rail, a bottom rail, two standing rails, and bends coupling the rails together, said rails and said bends having a hat profile with a crown facing towards the interior of the vehicle, and inner and outer side flanges integrally formed from a single steel sheet,
an impact guard bridging a hole formed between the inner flanges of the rails of the frame, said impact guard being positioned directly adjacent said outer panel with no intermediate structural components disposed therebetween,
the outer side flange of the frame having varying width, and the outer panel being fastened along an edge of the outer flange.

13. The vehicle door according to claim 12, wherein the outer panel is folded around the edge of the outer side flange of the frame.

* * * * *